United States Patent [19]

Lekven

[11] 3,727,199

[45] Apr. 10, 1973

[54] STATIC MAGNETIC MEMORY SYSTEM

[75] Inventor: Carl M. Lekven, Los Angeles, Calif.

[73] Assignee: Signals Galaxies, Inc., Van Nuys, Calif.

[22] Filed: Apr. 20, 1971

[21] Appl. No.: 135,765

Related U.S. Application Data

[63] Continuation of Ser. No. 805,320, March 7, 1969, abandoned.

[52] U.S. Cl. ..340/174 TF, 340/174 CT, 340/174 M, 340/174 AG, 340/174 BC, 340/174 CC

[51] Int. Cl. .......G11c 11/08, G11c 5/02, G11c 11/14

[58] Field of Search..................340/174 CT, 174 CB, 340/174 AG, 174 BC, 174 CC

[56] References Cited

UNITED STATES PATENTS

| | | | |
|---|---|---|---|
| 3,428,956 | 2/1969 | Bobeck | 340/174 BC |
| 3,435,435 | 3/1969 | Bergman et al. | 340/174 BC |
| 3,470,545 | 9/1969 | Bonyhard | 340/174 BC |
| 3,512,142 | 5/1970 | Fedde | 340/174 BC |
| 3,445,830 | 5/1969 | Middelhoek | 340/174 CB |

OTHER PUBLICATIONS

IBM Technical Disclosure Bulletin "Non Destructive Readout Magnetic Element" by Speliotis et al., Vol. 6, No. 6, 11/63, pages 55, 56.

*Primary Examiner*—Stanley M. Nrynowicz, Jr.
*Attorney*—Nilsson, Robbins, Wills & Berliner

[57] ABSTRACT

A magnetic memory element is disclosed along with a process for producing such elements in plurality to constitute a static magnetic memory or digital information storage system. Individual binary storage members are afforded directionally preferential magnetic characteristics by flux circuits to establish the preferred axis of magnetization. Conductors for driving the individual binary storage members (for storing and sensing) are provided in an organized pattern to accomplish selectivity. A batch-production process is also disclosed.

10 Claims, 9 Drawing Figures

INVENTOR
CARL M. LEKVEN

BY Nilsson + Robbins
ATTORNEYS

INVENTOR
CARL M. LEKVEN

BY Nilsson + Robbins
ATTORNEYS

STATIC MAGNETIC MEMORY SYSTEM

This application is a continuation of Ser. No. 805,320, filed Mar. 7, 1969, now abandoned.

BACKGROUND AND SUMMARY OF THE INVENTION

The use of magnetic elements, as in an organized array to operate as a digital memory, or storage unit in an electronic data processing system is well known and various forms of such systems are in widespread use. Generally, in prior conventional systems, the individual elements (or cores as they are sometimes called) have the binary capability to register either a "one" or a "-zero" depending upon the directional state of residual magnetism. Otherwise, various prior systems have employed a wide range of structures and logical organizations. For example, coincident-current systems have been utilized whereby selected individual cores are designated by the coincidence of certain predetermined electrical currents, as to identify the particular core selected for sensing or storing. In another system of the prior art, rather than selecting a specific core, linear word selection is accomplished whereby a group of individual cores or memory elements define words that are commonly associated with a particular electrical conductor. Thus, entire digital words are stored and sensed, rather than individual binary digits.

In accordance with another classifying characteristic of prior static magnetic storage systems, operation has been either on the basis of "destructive read-out" or "non-destructive read-out." "Destructive read-out" operation involves loss of the digital information from the memory elements as they are sensed. Consequently, in systems of that type, it has been common practice to incorporate additional circuits to re-establish the stored information subsequent to sensing. Systems which utilize the "non-destructive read-out" mode preserve digits registered in the memory elements throughout the sensing operation. That is, the directional orientation of residual flux that manifests a stored digit is not lost in the process of sensing a core. As a consequence, these systems avoid the need for auxiliary circuits to re-establish a stored digit after each memory element is sensed.

In the development of improved magnetic storage systems, attendant the increasing demand for these units, the need has arisen to provide elements having preferred directions for remanent magnetic flux, i.e., directions of flux orientation which are favored by remanent flux in the storage elements. This characteristic, for example, has been effectively employed to accomplish both non-destructive read-out and destructive read-out operation in storage systems.

In addition to the vast effort expended in improving the speed while reducing the size and complexity of static magnetic memory systems, considerable effort has also been directed toward attaining an improved method for producing such systems. Initially, static-magnetic memory systems employed a plurality of discrete cores, each in an annular form and supported in large numbers by electrical conductors which also provided magnetic drive flux. Subsequently, various techniques and processes have been proposed with the objective of accommodating mass-production methods for static-magnetic memory systems. For example, it has been proposed to utilize thin ferromagnetic films as binary core elements which could be deposited by mass production methods. Although substantial progress has been made with regard to improved manufacturing techniques for core memory systems, considerable difficulty still exists in employing such techniques to batch-fabricate or mass produce memory systems. Specifically, for example, without dimensional shaping, preferred directional magnetic characteristics in the memory elements have been accomplished by vacuum depositing, electro-plating or otherwise accomplishing thin films in the presence of a strong polarizing field. Under precisely controlled conditions, that technique produces anisotropic magnetic elements that have the desired directional characteristics, e.g., the so-called "easy" and "hard" axes of magnetic remanance. However, vacuum-deposition processes are slow and require vast equipment for quantity production. Additionally, the thickness of elemental films so deposited must be limited or the desired anisotropy is lost, with the result that signal output is restrictively low. Consequently, these techniques have severe limitations that have restricted widespread use. As a result, a considerable need exists for a memory system that may be manufactured by mass-production techniques, without vast and complex equipment, and which does not demand severe characteristics of individual magnetic elements.

In general, the present invention comprises a system utilizing individual planar magnetic elements which may, for example, take the form of thin-film or thick-film spots and which are afforded directional characteristics by association with contiguous magnetic flux circuits. That is, the individual magnetic elements, comprise, for example, a "hard" magnetic material (high degree of retentivity and high permeability) associated with magnetic circuit structures comprising a "soft" magnetic material, i.e., low reluctance and high permeability. The magnetic-circuit structures afford the directional characteristics desirable for the individual magnetic elements e.g., spots so that the spots can be formed without thickness limitations or internal directional characteristics by any of a number of well known production techniques. The system also includes electrical conductors for providing magnetic flux to selectively drive the magnetic elements.

BRIEF DESCRIPTION OF THE DRAWINGS

In the drawings which constitute a part of this specification, exemplary embodiments demonstrating various objectives and features hereof are set forth, specifically.

DETAILED DESCRIPTION OF THE ILLUSTRATIVE EMBODIMENT

Figure 1:
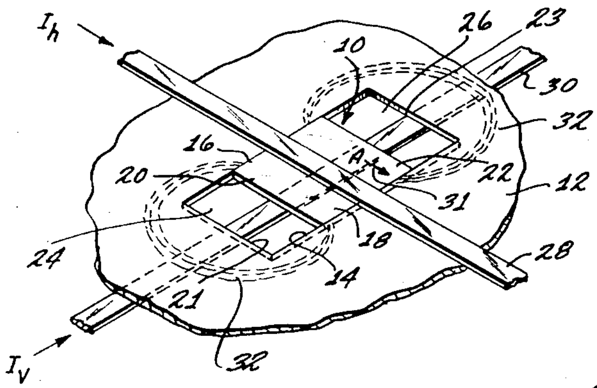
FIG. 1 is a trimetric view of a memory element incorporating the present invention.

Referring now to FIG. 1, there is shown a single elemental binary-memory unit 10 of square shape and having a finite thickness. The unit 10 is of material having a relatively high magnetic retentivity and, as disclosed herein, also having a substantially rectangular hysteresis loop. The "hard" magnetic characteristic of the unit 10 may be accomplished by utilizing ferrite material, ferric oxide or nickel cobalt as generally well known in the prior art that is so characterized.

The unit 10 is positioned contiguous to a magnetic circuit member 12 as described in great detail below. Specifically, the square unit 10 is received centrally within a rectangular aperture 14 that is defined in the plane sheet member 12. Consequently, the ends 16 and 18 of the unit 10 abut internal parallel edges of the member 12 while the ends 20 and 22 are spaced apart from the opposed internal edges 21 and 23 of the member 12. As a result, air gaps 24 and 26 are defined between the unit 10 and the sheet member 12 along one axis (lower left to upper right) of the unit 10; however, no air gaps exist along a perpendicular axis which is designated as the axis A. Consequently, a closed magnetic circuit is provided for residual flux in the unit 10, which flux is oriented along the axis A. However, residual flux that is oriented along a perpendicular axis (FIG. 2) encounters air gas 24 and 26.

Preliminary to considering the detailed operation of the element of FIG. 1, it must be recognized that drive means are provided to establish magnetic flux in the unit 10 that is oriented along various axes. Specifically, the elemental binary unit 10 is magnetically driven by a pair of perpendicularly disposed flat conductors 28 and 30 (several round could be employed) which may comprise copper and are substantially parallel to the plane defined by the unit 10 and the sheet member 12.

The significant feature of the memory element, as depicted in FIG. 1, stems from the fact that the unit 10 possesses directional characteristics which enable the element to operate in systems and in accordance with techniques previously utilized in conjunction with magnetic elements having anisotropic characteristics. That is, various prior memory systems have employed anisotropic magnetic materials (having a preferred to "easy" direction, or axis of magnetic flux orientation, to which the material is sympathetic) and a substantially perpendicular "hard" axis (unstable). In general, systems employing such materials have utilized one direction of magnetization (along the "easy" axis) to store a "one" and the other direction to designate a "-zero." Such binary information has been sensed from the unit by driving the magnetic flux to rotate off the "easy" axis of magnetization and thereby induce a voltage in a sense conductor. However, subsequently with the termination of the magnetic drive force, the residual magnetic flux returns to the prior direction along the "easy" axis of magnetization, thereby reestablishing the registered binary digit. Consequently, such systems have accomplished a structurally-simple form of non-destructive read-out and are fully applicable to destructive read-out systems as well known in the prior art.

Referring to FIG. 1, it may be seen that when the unit 10 is magnetized along the axis A (in either direction) magnetic flux lines 32 are accommodated to pass through the low-reluctance member 12. However, when the unit 10 is magnetized along the perpendicularly-shifted axis B (FIG. 2) the magnetic lines 34 must traverse high-reluctance air gaps 24 and 26. As well known in the prior art, if a low reluctance path is provided for a magnet, the lines of residual flux will tend to close through that path. The related criterian which facilitates the operation of systems incorporating the present invention, is that a magnetic system will tend toward the lowest energy state and that state exists when the lines of flux are accommodated through a low-reluctance path. Summarily, the magnetization of the unit 10 along the axis A (FIG. 1) is stable and "easy;" however, magnetization of the unit 10 along perpendicular axis B (FIG. 2) is unstable and "hard."

Recapitulating to some extent, the flux lines in the unit 10 will prefer (tend to return to) the axis A (FIG. 1) along which axis they are accommodated through the low-reluctance member 12. On the contrary, the flux lines are directionally unstable when oriented along the axis B (FIG. 2) in which they must pass through the air gaps 24 and 26. As a consequence, energy must be applied to shift or revolve the flux lines from the axis A toward the axis B, and furthermore when such energy is removed, the flux lines may return to an orientation along the axis A. Thus, the magnetic element as depicted in FIGS. 1 and 2 accomplishes perpendicular "hard" and "easy" directions of magnetic orientation, without the unit 10 being formed of anisotropic material.

In the operation of the memory element of FIG. 1, currents $I_h$ (horizontal) and $I_v$ (vertical) are developed in the conductors 28 and 30 respectively. Specifically, the current in the conductor 30 develops magnetic flux causing the unit 10 to be magnetized along the axis A in the direction indicated by the arrow 31. Such magnetization may be arbitrarily designated to indicate a "one." The presence of an opposite-polarity current $-I_v$ will magnetize the unit 10 along the axis A; however, in a direction opposed to that indicated by the arrow 31 thereby manifesting a "zero."

Figure 2:
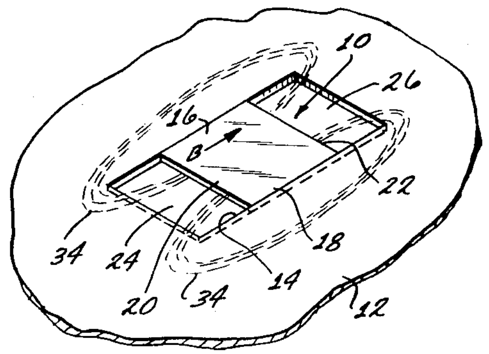
FIG. 2 is a fragmentary view of a portion of the structure illustrated in FIG. 1 illustrating a different flux orientation.

To sense the binary information stored in the unit 10 in accordance with the above convention, a current $I_h$ may be provided which will tend to revolve the magnetization of the unit 10 toward the "hard" axis B (FIG. 2). Thereupon, depending upon whether the unit 10 holds a "one" or a "zero", the flux lines will be rotated in either a clockwise or a counterclockwise direction. In the example assumed,a counterclockwise rotation induces a signal in the conductor 30 which is of a polarity to manifest a "one." On the contrary, a counterclockwise rotation produces an opposed current in the conductor 32 to manifest a "zero."

Upon the termination of electrical currents in the conductors, the residual flux is free from external driving forces and the flux lines return to their prior orientation. Of course, this operation assumes that the current $I_h$ was not of sufficient magnitude to rotate the flux such as to exceed the coercivity $H_c$. On the contrary, the rotation is less than $H_c$ and as a result, the operation of sensing binary information from the unit 10 affords non-destructive read-out.

Figure 3:
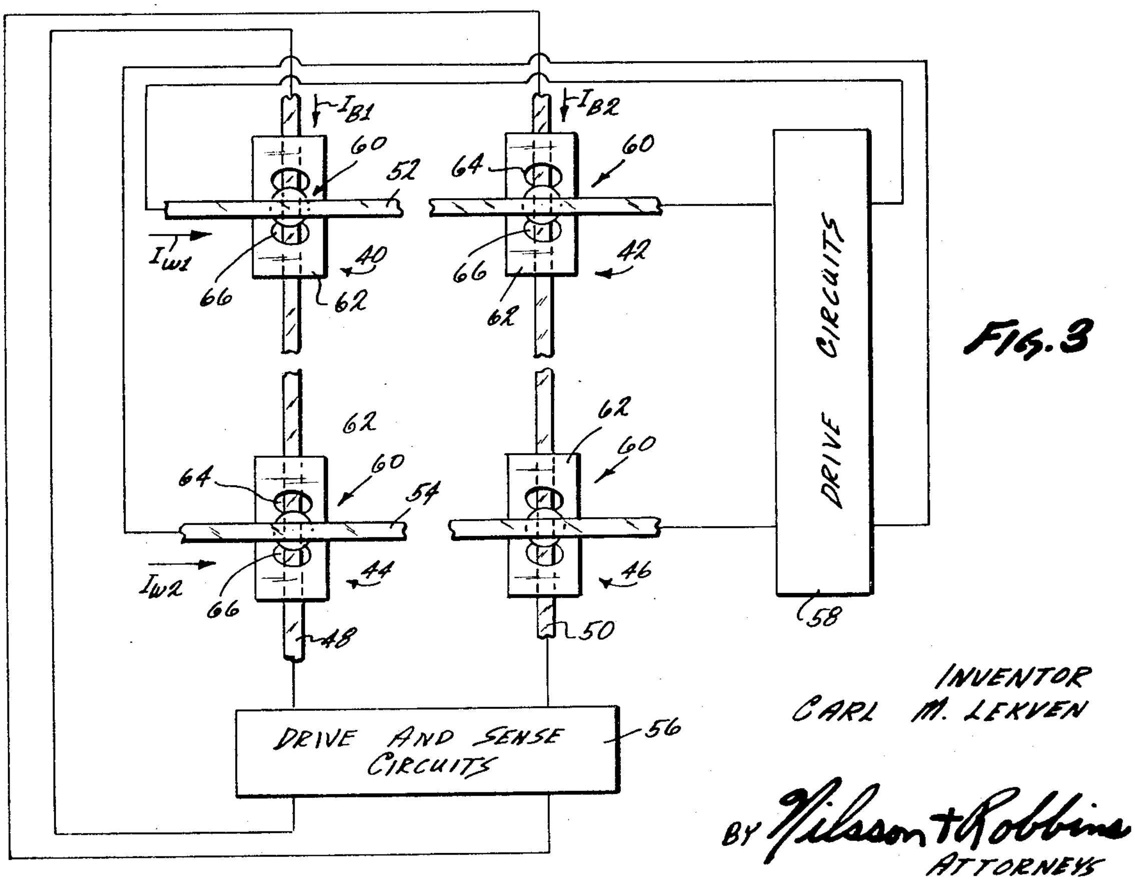
FIG. 3 is a plan view and block diagram illustrating a system incorporating a plurality of memory elements embodying the present invention.

In view of the above preliminary explanation of a single binary storage element, other aspects of the present invention may now be pursued with reference to other figures. Specifically, FIG. 3 shows a memory plane incorporating four binary elements 40, 42, 44 and 46. These elements are structurally somewhat different from that explained above, as considered below in detail; however, they simply illustrate another structural form embodying the present invention. The cores or elements 40 and 44 are linked (magnetically coupled by their proximity) to a vertical conductor 48, while the cores 42 and 46 are linked to a vertical conductor 50. Somewhat similarly, the elements 40 and 42 are magnetically coupled to a horizontal conductor 52 while the elements 44 and 46 are similarly coupled to a horizontal conductor 54.

The individual binary elements 40, 42 and 44 and 46 are similar, each including a "hard" magnetic unit 60 which is provided with a magnetic circuit member 62 defining the preferred magnetic axis to be horizontal (as the elements are shown). Structurally, the units 60 comprise flat disks of "hard" magnetic material which are seated in apertures that are defined in the members 62 so as to leave open gaps 64 and 66 in vertical alignment between the units 60 and the members 62. The actual shape of the air gaps 64 and 66 is somewhat elliptical, with the disk units 60 defining re-entrant curves.

In the logical organization of the system as shown in FIG. 3, those memory elements which are magnetically coupled to the conductor 52 comprise the storage capacity for one digital word. That is, each horizontal conductor is magnetically linked to a plurality of storage elements which store one binary word. Accordingly, currents in the horizontal conductors 52 and 54 carry currents designated as "word" currents, i.e., currents $I_{W1}$ and $I_{W2}$ respectively. In distinction, the conductors 48 and 50 carry "bit" currents $I_{B1}$ and $I_{B2}$ respectively. The conductors 48 and 50, as indicated, are coupled to drive and sense circuits 56 which provide the currents $I_{B1}$ and $I_{B2}$. Somewhat similarly, the conductors 52 and 54 are directly connected to drive circuits 58 which provide the currents $I_{W1}$ and $I_{W2}$.

Prior to considering exemplary operations of the system as illustrated in FIG. 3, some definition of currents and flux directions is helpful. Accordingly, the following chart logically summarizes various operations with regard to the currents $I_{W1}$, $I_{W2}$, $I_{B1}$ and $I_{B2}$.

CHART

Equation — Single Currents (1) $I_{W1} + I_{W2} = \downarrow =$ unstable (read)
(2) $(-I_{W1}) + (-I_{W2}) = \uparrow =$ unstable (read)
(3) $I_{B1} + I_{B2} = \leftarrow =$ "ONE"
(4) $(-I_{B1}) + (-I_{B2}) = \rightarrow =$ "zero"

Dual Currents (5) $(I_{W1} + I_{W2}) \cdot (I_{B1} + I_{B2}) = \swarrow =$ write "one"
(6) $(I_{W1} + I_{W2}) \cdot ([-I_{B1}] + [-I_{B2}]) = \searrow =$ write "zero"
(7) $([-I_{W1}] + [-I_{W2}]) \cdot (I_{B1} + I_{B2}) = \nwarrow =$ write "one"
(8) $([-I_{W1}] + [-I_{W2}]) \cdot ([-I_{B1}] + [-I_{B2}]) = \nearrow =$ write "-zero"

Code: "+" is logic "or"; "." is "and"

The above chart presents logic equations for the various possible currents and combinations of currents which may exist in the drive conductors 48, 50, 52 and 54. Although the logic equations are deemed to be explicit, some further explanation may be desirable. For example, equation 1 states that the presence of either of the currents $I_{W1}$ or $I_{W2}$ will result in each associated memory unit 60 being driven with the flux therein oriented in a downward direction, as indicated by the arrow in equation 1. Additionally, the equation states that the flux orientation is unstable (being a high energy configuration). Such an orientation for the flux, or one approaching that orientation may be employed to read the contents of memory units 60.

Equation 2 states that either of the negative currents $-I_{W1}$ or $-I_{W2}$ will produce a magnetic flux orientation in an upward direction. It is to be appreciated, of course, that the indicated directional orientations in the separate equations are consistent, with regard to polarity, e.g. "north" indicates an upward orientation of flux in the plane of the disk units 60.

Equation 3 indicates that the currents $I_{B1}$ or $I_{B2}$ result in a directional flux oriented to the left which incidentally is assigned to be representative of the binary "one". Conversely, either of the negative currents $-I_{B1}$ or $-I_{B2}$ will produce a flux orientation directed to the right, which manifests a binary "zero" (arbitrary).

In summary, with regard to the first portion of the chart covering single currents, it is noteworthy that the first two equations cover currents which might be employed to sense the units 60 while equations 3 and 4 define currents which could be employed to register digits. However, in the interest of operating in a non-destructive mode, dual currents are generally used rather than individual currents. These dual currents are considered in the second portion of the chart.

The equation 5 indicates that either of the currents $I_{W1}$ or $I_{W2}$ in combination with either of the currents $I_{B1}$ or $I_{B2}$ will produce a directional flux oriented downward and to the left, which flux may be employed to store a "one." That is, as this orientation is unstable, when the drive flux ceases, the orientation resumes a stable direction, i.e. the left. Somewhat similarly, equation 6 indicates that either the current $I_{W1}$ or the current $I_{W2}$ in combination with the negative current $-I_{B1}$ or the negative current $-I_{B2}$ will produce a flux orientation downward and to the right which may be employed to register a "zero." Again, on removal of the drive currents, the orientation will be re-established along a horizontal axis to the right. Equations 7 and 8 consider two further possibilities which result in flux orientations upward and to the right or left. The currents so defined could be employed to register a "one" or a "-zero."

From the above chart, it may be seen that the individual memory elements 40, 42, 44 and 46 may be variously driven by drive circuits 56 and 58, (as well known in the prior art) to store or sense binary digits. Considering an exemplary manner of driving the memory elements, assume it is desired to register a "one" in the memory element 40. Of course, a current $I_{B1}$ may be employed; however, such a current will record a "one" in all the memory elements carried on the vertical conductor 48. In the interests of avoiding such lack of selectivity, the memory element 40 may be individually driven by a combination of the currents $I_{W1}$ and $I_{B1}$. In this regard, it is to be noted that the orientations indicated in the above chart assume strong currents and attendant intense magnetic fields. However, in an operating embodiment, currents are maintained below a threshold level to facilitate selectivity as well known in the prior art.

Pursuing the assumed example of selectivity accomplishing a "one" in the element 40, the current $I_{W1}$ is first provided to drive the flux orientation in the unit 60 of the element 40 to an axis that approaches but does not attain the threshhold e.g. vertical. As a result, if no additional magnetic forces are applied and the current $I_{W1}$ is removed, the residual flux in the unit 60 will return to its prior direction of orientation. However, with the flux in the orientation approaching vertical, the current $I_{B1}$ is also supplied which causes the flux orientation to be shifted through the vertical, downward, and to the left. It is to be noted, that the current $I_{B1}$ acting alone is not of sufficient strength to effect the flux orientation that is thus accomplished in the element 44.

Recapitulating, the flux orientation in the element 40 is established to be downward and to the left, by reason of the driving force of the combined currents $I_{B1}$ and $I_{W1}$. On the termination of such currents, the residual flux assumes the most accessible stable orientation, specifically an orientation directed to the left, which is the orientation for storing a binary "one."

To register a binary "zero" the current $I_{W1}$ is applied in combination with the current $-I_{B1}$. On the termination of such currents, the most accessible stable orientation for the residual flux is to the right (representative of "zero"). Thus, binary digits are selectively stored in the individual memory elements as depicted in FIG. 3 under control of selected electrical currents.

Considering the overall operation of the system of FIG. 3 in greater detail, it is noteworthy at the outset that the system is operated as a so-called "word" register. In this regard, rather than to store and sense individual binary digits, the system operates on the basis of binary words including several digits, which are sensed (or stored). In the configuration of the system, one word is provided in the memory elements associated with each horizontal conductor carrying a current $I_W$ (word). Specifically, the memory elements 40 and 42 comprise bits or binary digits of the word that is associated with the current $I_{W2}$ in the conductor 54. Consequently, the storage of a digit in the memory element 40 is normally performed concurrently with the storage of digits in all the other elements associated with the conductor 52, e.g. element 42.

If a binary code word is to be stored, for example, in the elements associated with the horizontal conductor 54 (elements 44 and 46) the operation might follow a pattern as will now be described. Initially the current $I_{W1}$ is provided from the drive circuits 58 to revolve the magnetic flux in the associated elements toward the threshold of coercivity e.g. vertical. Currents $I_B$ in the vertical conductors then establish flux orientations to store either a "one" or a "zero+ in each individual element. Specifically, positive currents $I_B$ will accomplish "ones" while negative currents $-I_B$ will accomplish "-zero." For example if the currents $I_{B1}$ and $-I_{B2}$ are provided in combination with the current $I_{W2}$, a "one" is stored in element 44 while a "zero" is stored in element 46.

It is to be noted that in the operation as described above, the currents $I_{B1}$ and $-I_{B2}$, although effective on the elements that do not lie in the designated word, e.g. elements 40 and 42, the effect is not destructive of stored information. That is, because the currents $I_{B1}$, and $-I_{B2}$ alone are not of sufficient magnitude to revolve the flux in the units 60, stored information is preserved.

Pursuing the exemplary operation described above, assume it is desired to sense the "one" stored in element 44 along with the "zero" stored in element 46 and all other elements constituting the word of the conductor 54. Recapitulating, a "one" is manifest by flux oriented to the left while "zero" is manifest by flux oriented to the right. The determination of which orientation exists for each of the elements 44 and 46 is accomplished by a pulse of the current $I_{W2}$ which is of insufficient magnitude to drive or revolve the flux orientation through the threshold of coercivity Hc. For purposes of this example, assume that threshold to be a vertical axis of alignment. The pulse of current $I_{W2}$ through the conductor 52 does swing the flux orientation through an angle less than the threshold but which is sufficient to induce a detectable voltage in the conductor 48. The sense or polarity of the pulse so induced in the conductors 48 and 50 is indicative of the binary digits stored in the memory elements 44 and 46. That is, the pulse that is in-duced in the conductor 48 is of a polarity to indicate a "one" while the pulse induced in the conductor 50 is of the opposite polarity and indicates a "zero." The sensing circuits for these detecting pulses and the polarities thereof are well known and are incorporated with the drive circuits in the block 56.

Although specific exemplary drive and sense currents have been described in the above examples, it is to be recognized that a wide range of possibilities exist as may be apparent from the above chart of logic equations. Furthermore, it is to be appreciated that many drive and sense techniques are well known in the prior art as are numerous specific circuits for accomplishing select operations.

Figure 4:
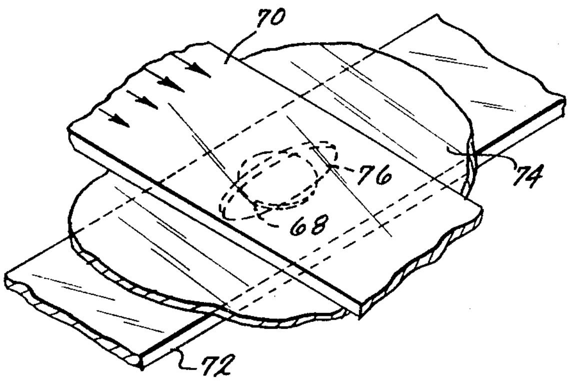
FIG. 4 is a trimetric view of another embodiment of a memory element incorporating the present invention.

The specific structures for the magnetic memory elements as set forth above (FIGS. 1 and 3) are clearly illustrative forms the present invention may utilize. Another such exemplary form is shown in FIG. 4 which will now be considered in detail. A small disk 68 comprises the memory unit which is carried as a thin film on the underside of a horizontal flat conductor 70. A transverse vertical conductor 72 is separated from the horizontal conductor 70 by the disk 68 as well as a fragment of a sheet 74 of low-reluctance material having an oval aperture 76 defined therein.

Figure 5:
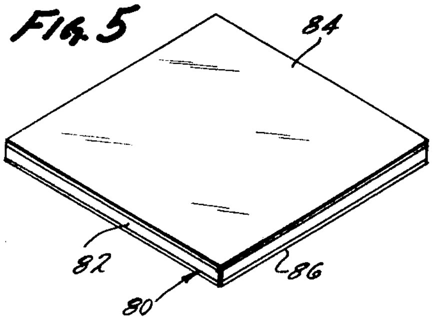
FIG. 5 is a trimetric view illustrating an initial step in a process for producing a memory system in accordance with the present invention.

In the single magnetic memory element of FIG. 4, as described above the residual magnetic flux lines in the disk 68 (high permeability material) strongly prefer orientation in a horizontal direction (parallel to conductor 70) so that the closing lines of flux are accommodated through the sheet 74 without traversing a gap. Stated in another way, residual flux that is oriented in a vertical direction in the disk 68 is unstable and upon termination of magnetic driving force, the residual flux in the disk 68 will move to be oriented horizontally to enable accommodation through the magnetic circuit provided by the sheet 74. It may therefore be seen that the element as shown in FIG. 4 is readily operable to store binary information as described above. Additionally, the structure is well adapted to mass-production by utilizing a process as will now be considered with reference to FIGS. 5–9. Referring initially to FIG. 5 the production of a single partial plane is considered. Initially, a plated board or sheet 80 is provided as well known in the prior art and is readily available. The sheet comprises a substrate 82 of glass, for example, which is clad on both sides with conductive metal, e.g. copper foil layers 84 and 86.

Figure 6:
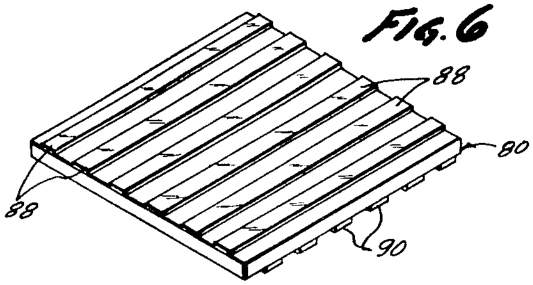
FIG. 6 is a trimetric view illustrating another step in a process for producing a memory system in accordance with the present invention.

The layers 84 and 86 are selectively etched as indicated in FIG. 6, to provide elongate conductors 88 on one surface of the substrate 80 and perpendicular conductors 90 on the opposed side. Various etch-circuit techniques may be employed as well known in the prior art to accomplish the two sets of conductors with those on each side of the plate being parallel while those on each side are perpendicular to those on the other side.

The next step in the process (FIG. 7) involves the deposition of memory unit disks 92 on the conductors 88. The small thin films in a disk configuration may be deposited on the conductors 88 using nickel-ferrite ink, paint, or related materials. For example, silk screen techniques may be employed as well as offset printing techniques or any of a variety of other methods whereby the layers comprising the units 92 are formulated as individual, discrete areas possessing the magnetic characteristics as described above for memory units.

Figure 7:
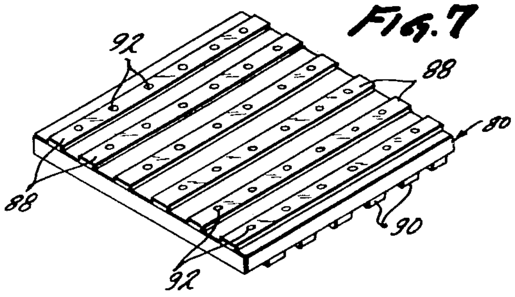
FIG. 7 is a trimetric view illustrating still another step in a process for producing a memory system in accordance with the present invention.

The following step in the process (FIG. 8) is one of assembly wherein structure of FIG. 7 is formulated into an integrated sub-unit package including that structure along with an insulating sheet 94 of mylar, or other sheet plastic for example, a sheet 96 of magnetically "-soft" material and another insulating sheet 98. The sheet 96 defines an array of oval apertures 99 (one for each disk 92)and provides the magnetic circuits for the individual memory elements.

Figures 8, 9:
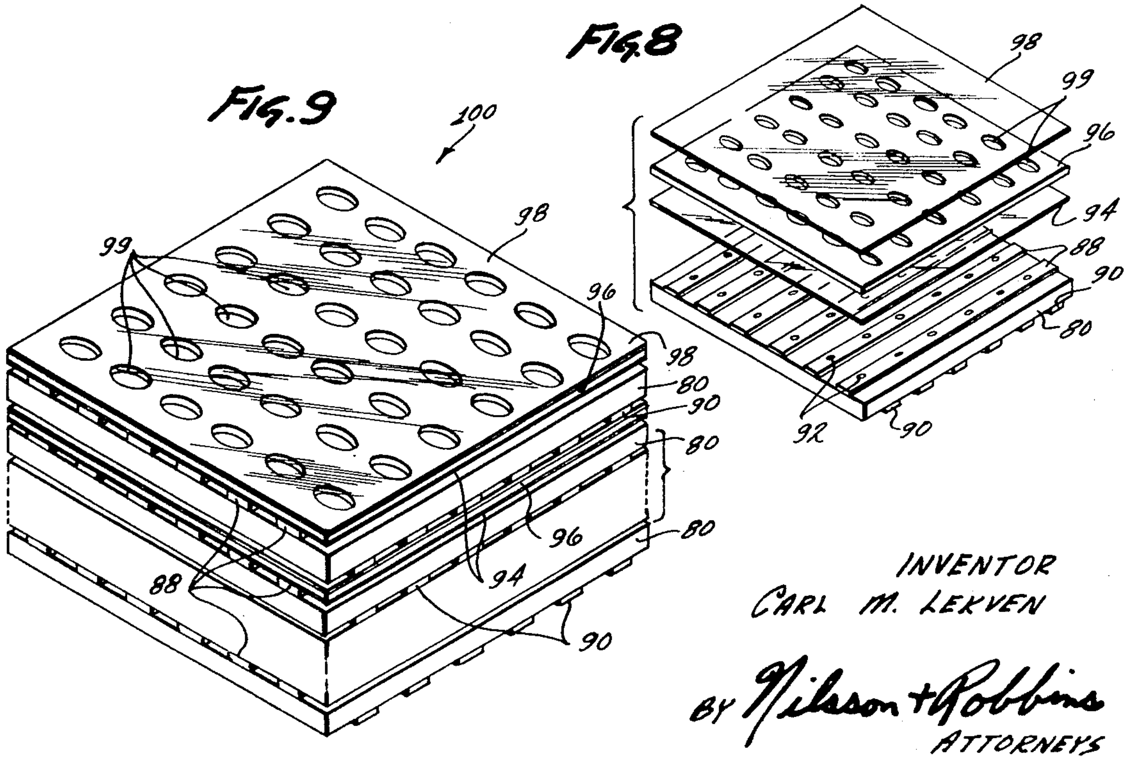
FIG. 8 is a trimetric view illustrating a final step in a process for producing a memory system in accordance with the present invention.
FIG. 9 is a trimetric view illustrating a memory stack constructed in accordance with the present invention.

Upon completion of the sub-unit package, as depicted in FIG. 8, a plurality of such packages are stacked together in a configuration 100 as indicated in FIG. 9 so that other than at the stack ends, the conductors 90 on the bottom of one package mate with the conductors 88 on the top of an adjacent package to afford a plane of memory elements. The number of planes in the stack or configuration 100 may vary widely. Of course, in operation of the stack, the conductors are coupled to circuits utilizing the teachings set forth above to afford operative memory planes.

As is apparent from the above, the individual memory units deposited in any of a variety of batch process techniques may be established without the anisotropic characteristics requisite in certain prior systems. That is, as disclosed herein as a consequence of using magnetic-circuit keepers in cooperation with magnetic elements of isotropic material, a considerably improved structure is provided for both destructive and non-destructive read-out memory systems. As a consequence, a wide number of possibilities exist for utilizing production methods to print, paint, or otherwise deposit the magnetic material in planar form while in a liquid or semi-liquid state without the need for elaborate processes as previously employed.

What is claimed is:

1. A magnetic memory element comprising:

a planar magnetic unit of substantially isotropic material, and having a characteristic of residual magnetism;

magnetic circuit means positioned adjacent to said magnetic unit such that first and second different axes of magnetic flux orientation extending in, and parallel to the plane of said unit, have dissimilar magnetic characteristics, said first axis defining an energy state for magnetic flux that is lower than said second axis;

means for magnetically driving said magnetic unit to provide magnetic flux oriented along said first axis to register binary data, and to revolve the axis of magnetic flux orientation from substantial alignment with said first axis to an axis in substantial alignment with said second axis; and means for sensing magnetic variations in said unit to indicate registered information.

2. A magnetic memory element according to claim 1 wherein said magnetic unit comprises a shape to provide said first and second axes of magnetic flux orientation of substantially equal length.

3. A magnetic memory element according to claim 1 wherein said magnetic unit, said magnetic circuit means, said means for driving and said means for sensing each is substantially flat and in planar relationship with said unit.

4. A magnetic memory element according to claim 1 wherein said means for magnetically driving comprises first electrical conductor means and said means for sensing comprises second electrical conductor means in space quadrature to said first electrical conductor means.

5. A magnetic memory element according to claim 1 wherein said magnetic unit comprises a thin member of substantially isotropic magnetic material.

6. A magnetic memory element according to claim 5, wherein said means for magnetically driving comprises first electrical conductor means and said means for sensing comprises second electrical conductor means in space quadrature to said first electrical conductor means, and further includes drive circuits for energizing said electrical conductor means.

7. A planar magnetic memory structure, comprising:

a base member of electrically insulating material defining a substantially flat surface;

a plurality of discrete planar units of substantially isotropic, residual magnetic material supported on said flat surface;

means affixed to said base member including a unitary flat sheet of low reluctance magnetic material for providing magnetic circuits to produce directional magnetic characteristics for said planar units in the plane thereof; and conductor means extending parallel to said planar units to selectively drive and sense magnetic variations in said discrete planar units.

8. A magnetic memory structure according to claim 7 wherein said conductor means includes drive conductors extending substantially in space quadrature relationship.

9. A planar magnetic memory structure according to claim 7 wherein said means affixed to said base member include means to produce magnetic circuits for said planar units to accommodate magnetic flux along a single axis parallel to said planar units.

10. A planar magnetic memory structure according to claim 9 wherein said conductor means include means for rotationally displacing the orientation of magnetic flux in said planar units and means for sensing such displacement.

* * * * *